United States Patent [19]
Oshiro et al.

[11] Patent Number: 5,916,604
[45] Date of Patent: Jun. 29, 1999

[54] INJECTION MOLDING MACHINE

[75] Inventors: Takeo Oshiro; Masao Hirosawa, both of Shizuoka-ken, Japan

[73] Assignee: Toshiba Kikai Kabushkiki Kaisha, Tokyo, Japan

[21] Appl. No.: 08/787,009

[22] Filed: Jan. 29, 1997

[30] Foreign Application Priority Data

Jan. 30, 1996 [JP] Japan ................................. 8-014364

[51] Int. Cl.⁶ ................................................. B29C 45/17
[52] U.S. Cl. .................... 425/190; 264/328.11; 425/574; 425/595
[58] Field of Search .................... 425/574, 595, 425/451, 150, 338, 589, 592, DIG. 223, 190; 264/328.1, 328.11

[56] References Cited

U.S. PATENT DOCUMENTS

| | | | |
|---|---|---|---|
| 3,951,579 | 4/1976 | Myers et al. ........................... | 425/190 |
| 4,021,181 | 5/1977 | Hehl ..................................... | 425/450.1 |
| 4,106,885 | 8/1978 | Poncet .................................. | 425/450.1 |
| 4,340,346 | 7/1982 | Hehl ..................................... | 425/152 |
| 4,544,340 | 10/1985 | Hehl ..................................... | 425/183 |
| 5,052,910 | 10/1991 | Hehl ..................................... | 425/150 |
| 5,352,394 | 10/1994 | Fujita et al. ........................... | 264/40.5 |
| 5,417,913 | 5/1995 | Arend ................................... | 264/328.1 |
| 5,618,487 | 4/1997 | Hettinga ............................... | 264/328.1 |

*Primary Examiner*—James P. Mackey
*Attorney, Agent, or Firm*—Finnegan, Henderson, Farabow, Garrett & Dunner, L.L.P.

[57] ABSTRACT

A combination of displacement mechanisms adaptive for positioning a stationary platen to a frame, permitting the stationary platen to be displaced toward an injection unit to allow an escaping extension of tie-rods in a mold clamp action, is operative to displace the same toward the injection unit for a maintenance service, so that it can be displaced toward the injection unit further from a molding position in a molding operation.

2 Claims, 10 Drawing Sheets

INJECTION MOLDING MACHINE

BACKGROUND OF THE INVENTION

1. Field of the Invention

The present invention generally relates to an injection molding machine, and particularly, to an injection molding machine in which a movable platen has a relatively small motion stroke for applications such as to an optical disc molding such as of a compact disc or digital video disc.

2. Description of Relevant Art

In such a type of injection molding machine, a movable platen that holds a movable mold is driven to advance relative to a stationary platen that holds a stationary mold, achieving a mold close action and a mold clamp action, before an injection nozzle enters a touching connection with this mold, where it injects a body of molten resin to be molded, which molding is followed by a combination of a retreat action at the injection side and a mold open action at the clamp side for taking out molded articles. For the optical disc molding, the stationary platen or the movable platen holds a stamper together with the stationary mold or the movable mold.

In this type of injection molding machine, the stamper needs a maintenance service to be performed while the mold is open.

However, in a conventional injection molding machine of such the type, the movable platen has its motion stroke designed within a necessary limit for taking out molded articles, so that in a mold open state the movable and stationary platens have therebetween an insufficient gap for a maintenance service to be completed without consuming much time.

SUMMARY OF THE INVENTION

The present invention has been achieved with such points in mind.

It therefore is an object of the present invention to provide an injection molding machine that permits a sufficient gap to be secured between movable and stationary platens for a facilitated maintenance service.

To achieve the object, according to a first aspect of the invention, there is provided an injection molding machine comprising: a clamping unit including a stationary platen for holding a stationary mold, a cylinder support fixed to a frame, a clamp cylinder incorporated in the cylinder support, a tie-rod for connecting the stationary platen to the cylinder support, a movable platen for holding a movable mold, the clamp cylinder having a clamp ram connected to the movable platen, a mold open-close cylinder for making the movable platen advance and retreat relative to the stationary platen, and the clamp cylinder being operable after a mold close action, for providing the tie-rod with a tensile force to perform a mold clamp action; an injection unit including a guide bar for mounting the injection unit on a base so that the injection unit is movable in a mold open-close direction, a nozzle touch cylinder having a cylinder rod for connecting the injection unit to the stationary platen, the nozzle touch cylinder being operable for driving the injection unit into an advance-retreat motion relative to the stationary platen, and an injection nozzle adapted in an advanced position of the injection unit to touch the mold, for injecting the molten resin to the mold cavity; and displacing means adaptive for positioning the stationary platen to the frame, permitting the stationary platen to be displaced toward the injection unit to allow an elongation of the tie-rod in the mold clamp action, and for displacing the stationary platen toward the injection unit for a maintenance service.

According to the first aspect, for a maintenance service, a displacing means is operative to displace a stationary platen toward an injection unit further from a molding position in a molding operation, thus permitting a wide gap to be secured between the stationary platen and a movable platen, resulting in a facilitated maintenance work.

According to a second aspect of the invention, as it depends from the first aspect, the displacing means comprises tie-rod locking means for keeping the tie-rod in a connection with the cylinder support in a molding operation and for releasing the tie-rod from the connection for maintenance service guide bar locking means for keeping the injection unit drivable into the advance retreat motion in the molding operation and for locking an advance-retreat motion of the guide bar to have the injection unit held at a retreat limit thereof for the maintenance service, and the nozzle touch cylinder being operable to displace the stationary platen toward the injection unit for the maintenance service According to the second aspect, in a molding operation, a tie-rod locking means serves for a locking function to keep a tie-rod in a connection with a cylinder support, while a guide bar locking means is operative to effect a lock release for an injection unit to be kept drivable into an advance-retreat motion by a nozzle touch cylinder. For a maintenance.service, the tie-rod locking means is operative for a lock release to have the tie-rod released from the connection with the cylinder support, and the guide bar locking means serves for A locking function to hold the injection unit at a retreat limit, allowing the nozzle touch cylinder to displace a stationary platen toward the injection unit, thus permitting an enlarged gap to be available between platens in tie maintenance service, without the provision of a dedicate cylinder for displacement, eliminating the need of a complicated or large-scaled structure.

According to a third aspect of the invention, as it depends from the first aspect, the displacing means comprises a displacement cylinder fixed to the cylinder support, the displacement cylinder having an end of the tie-rod inserted therein for a connection thereof with the cylinder support so that the displacement cylinder keeps the tie-rod in the connection with the cylinder support in a molding operation and makes the tie-rod displace the stationary platen toward the injection unit for the maintenance service, and the nozzle touch cylinder being changeable into a released state with the injection unit at a retreat limit for the maintenance service.

According to the third aspect, in a molding operation, a tie-rod is forced in a direction to be kept connected with a cylinder support, by a displacement cylinder exerting thereon a pressure overcoming a mold clamping force. For a maintenance service, a nozzle touch cylinder is released, and the tie-rod is forced in an opposite direction by the displacement cylinder, to displace a stationary platen toward an injection unit, thus permitting an enlarged gap to be available between platens in the maintenance service, without the provision of a dedicated cylinder for displacement, eliminating the need of a complicated or large-scaled structure.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
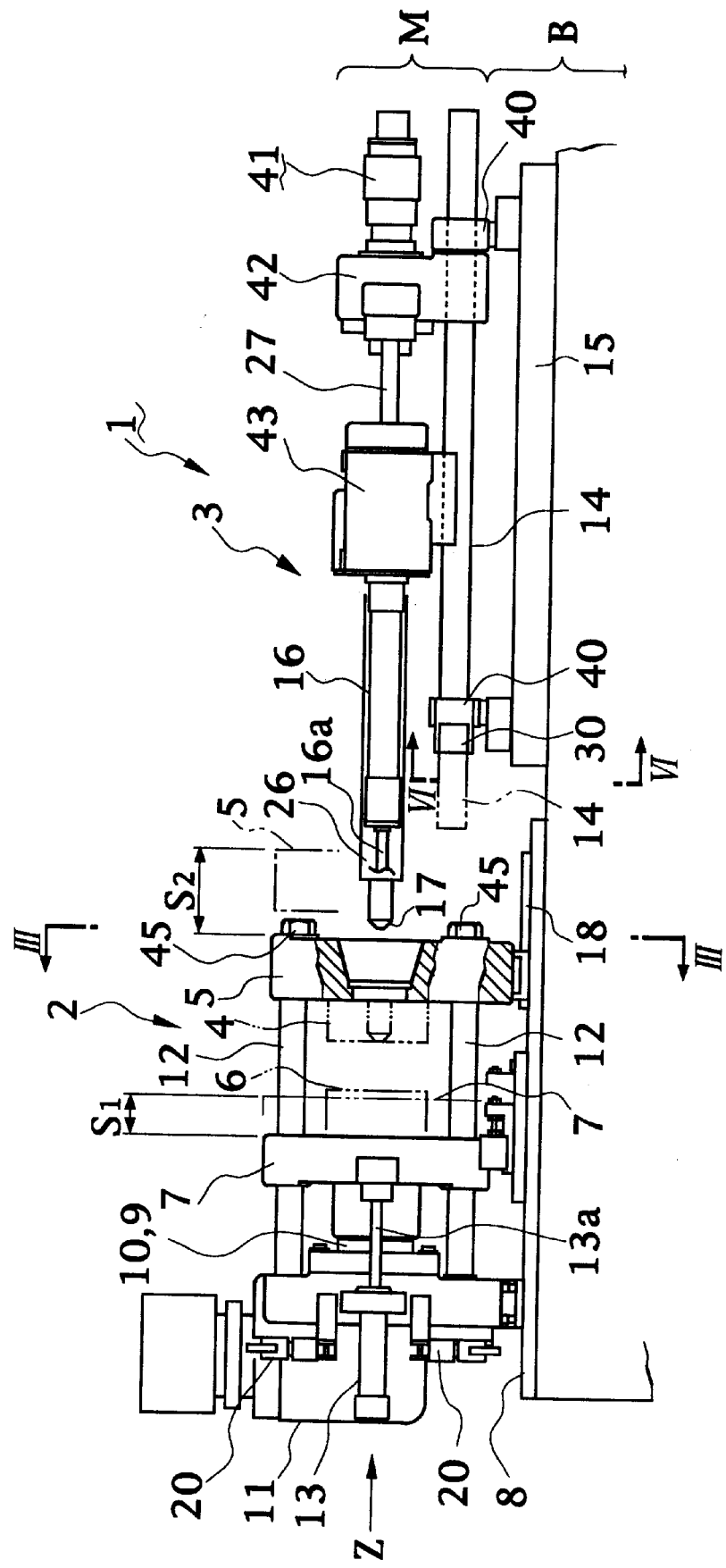
FIG. 1 is a front view, partly in section, of an entirety of an injection molding machine according to a first embodiment of the invention.

There will be detailed below the preferred embodiments of the present invention with reference to the accompanying drawings. Like members are designated by like reference characters.

Figure 2:
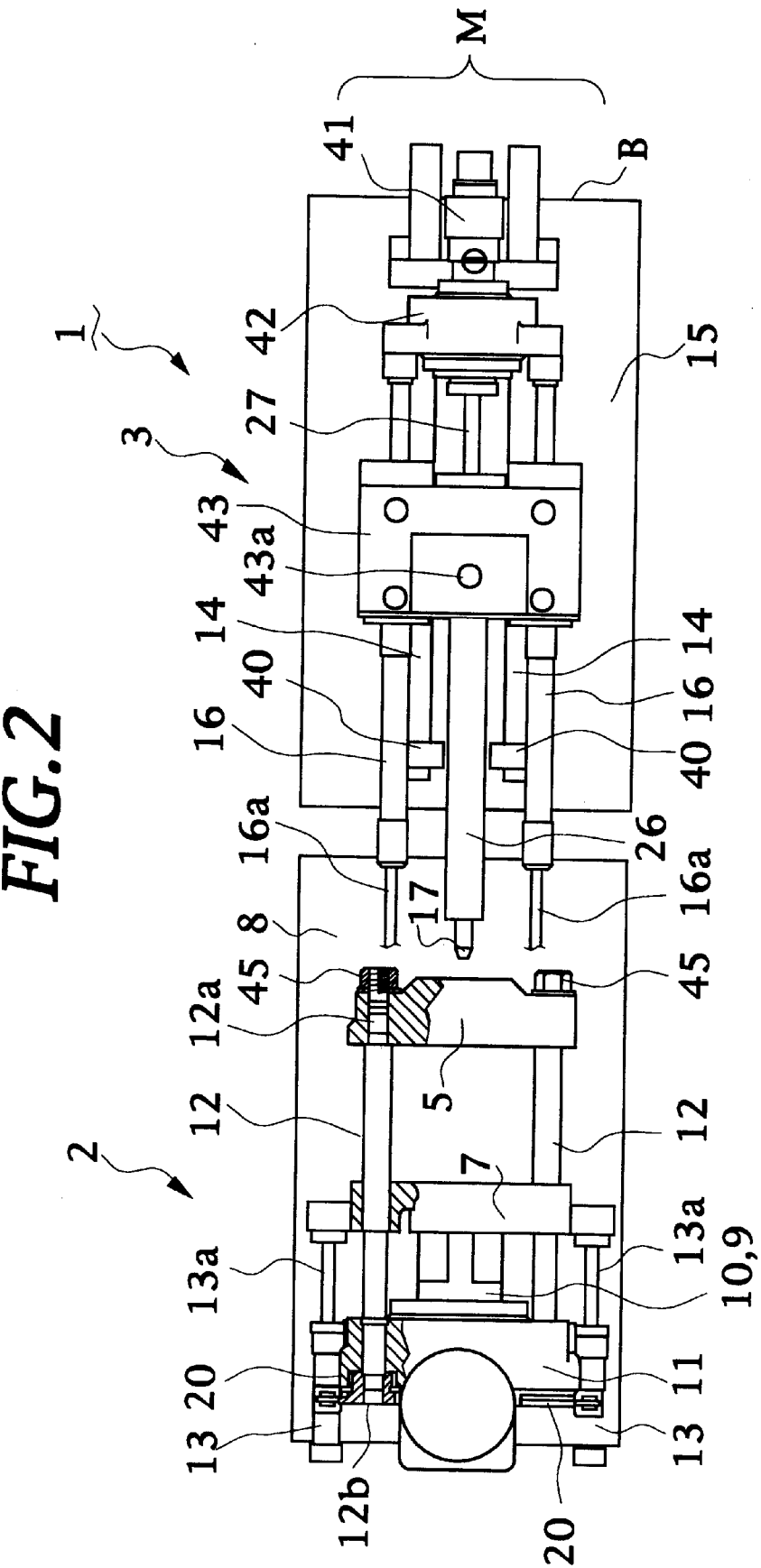
FIG. 2 is a plan, partly in section, of the injection molding machine of FIG. 1.

FIG. 1 is a front view of an injection molding machine 1 according to a first embodiment of the invention, and FIG. 2, a plan of the same.

As shown in FIGS. 1 and 2, the injection molding machine 1 comprises an injection unit 3 disposed at the right in the figure, and a clamping unit 2 disposed at the left.

First, there will be described an arrangement of the clamping unit 2, with reference to FIGS. 1 to 4, 5A and 5B.

Figure 3:
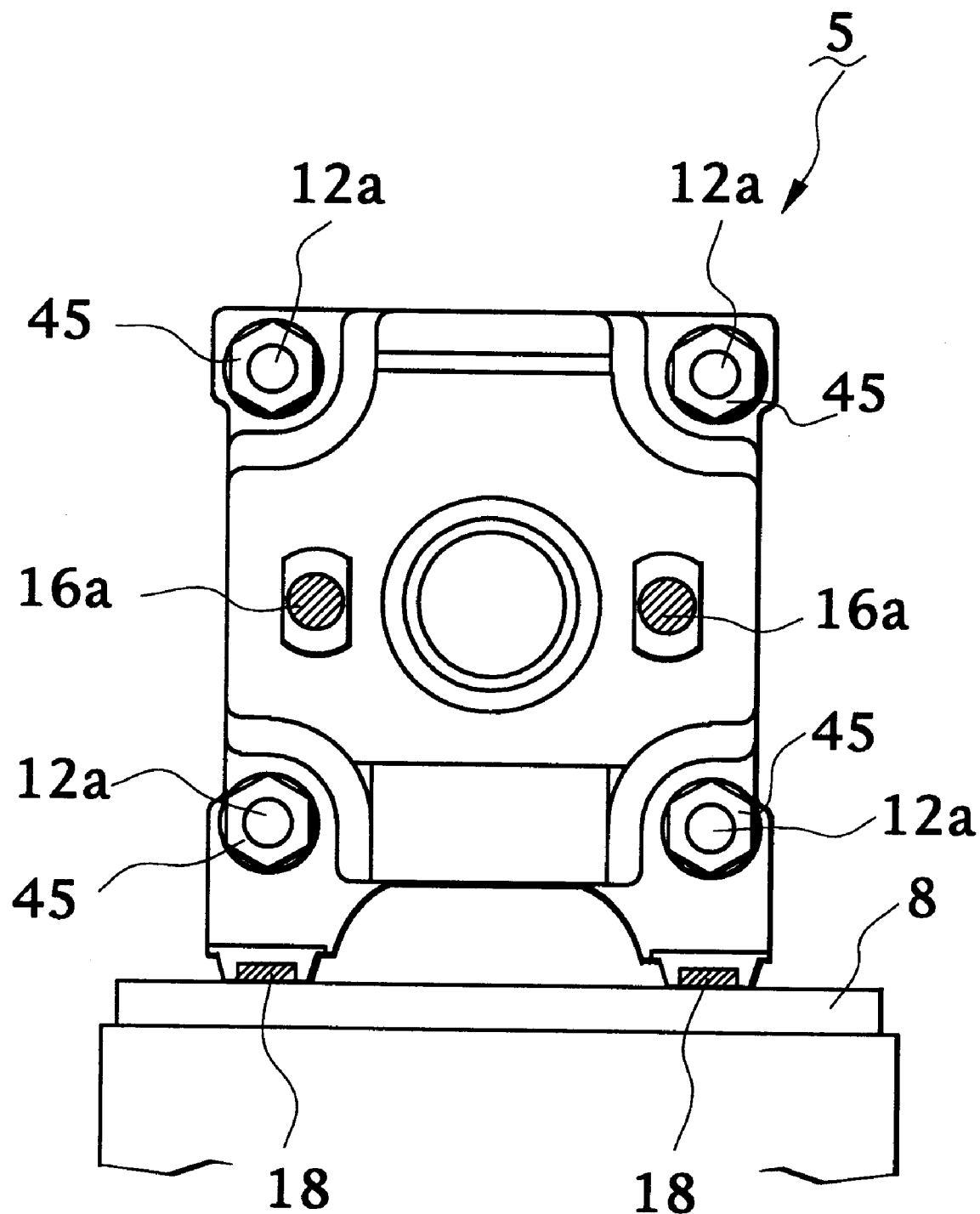
FIG. 3 is a section along line III—III of FIG. 1.
Figure 4:
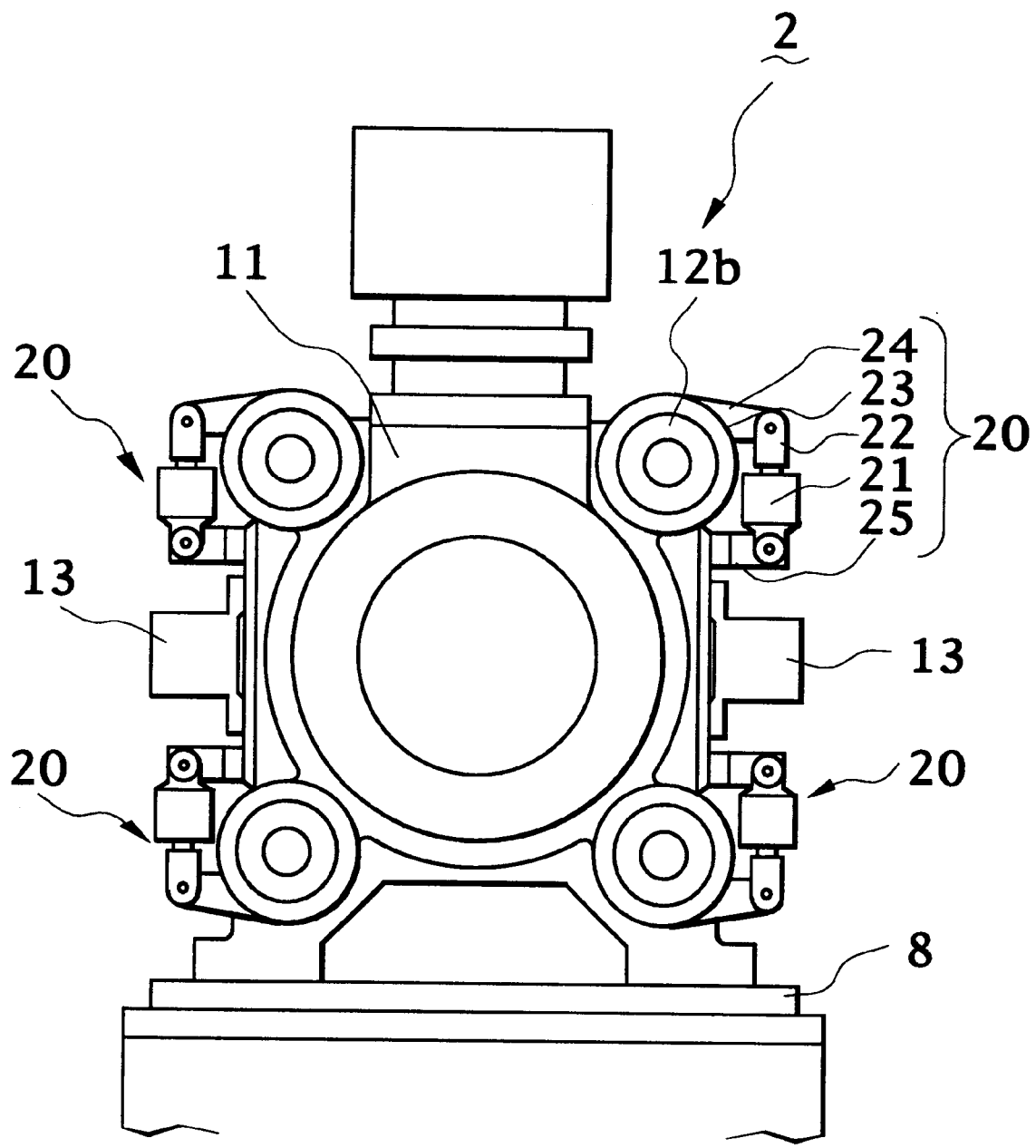
FIG. 4 is a view along an arrow Z of FIG. 1.
Figure 5A:
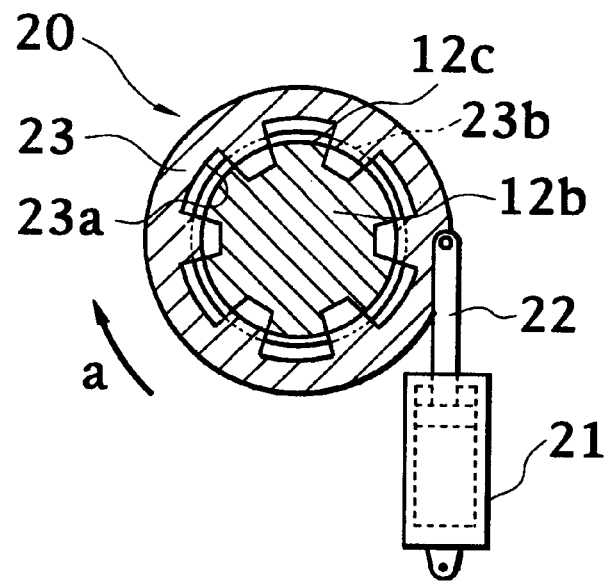
FIGS. 5A and 5B are illustrations of a tie-rod locking mechanism of the injection molding machine of FIG. 1, for functional explanations of a released state and a locking state, respectively.
Figure 5B:
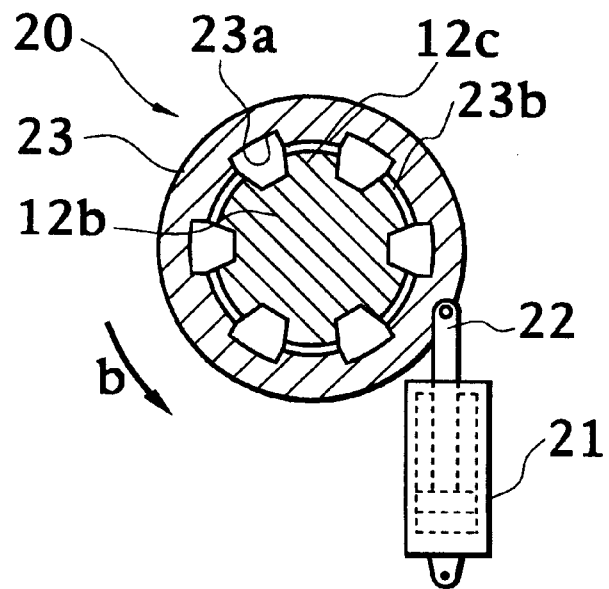

FIG. 3 is a section III—III of FIG. 1, FIG. 4, a view Z of FIG. 1, and FIGS. 5A and 5B, enlarged sections of an essential portion of FIG. 4.

The clamping unit 2 comprises a stationary platen 5 for holding a stationary mold 4, a movable platen 7 for holding a movable mold 6, a cylinder support 11 having a clamp cylinder 9 incorporated therein, and a pair of front and rear mold open-close cylinders 13 provided on the cylinder support 11.

The stationary platen 5 is connected by a quadruplet of upper front, upper rear, lower front and lower rear tierods 12 to the cylinder support 11 which is fixedly placed on a frame 8. A lower part of the stationary platen 5 is arranged to be slidable along a pair of front and rear parallel linear guides 18 (see FIG. 3) on the frame 8, so that the platen 5 can be displaced therealong in a mold open-close direction, i.e., in a left-right direction of FIG. 1. In other words, the platen 5 is fixed, as it is adaptive for a displacement toward the injection unit 3 to permit a rightward escaping extension of the tie-rods 12 in a mold clamp operation. The tie-rods 12 have their right ends 12a fitted in the stationary platen 5, to be connected thereto by applying nuts 45 (see FIG. 3), and their left ends 12b connected to the cylinder support 11 by a quadruplet of upper front, upper rear, lower front and lower rear tie-rod locking mechanisms 20.

As shown in FIG. 4, the tie-rod locking mechanisms 20 are disposed at four corners of the cylinder support 11, in correspondence to the four tie-rods 12. The mechanisms 20 are each composed of a ring member 23 rotatably arranged on the cylinder support 11, and a cylinder 21 connected at one end thereof via a cylinder rod 22 to a bracket 24 of the ring member 23 and at the other end thereof to a bracket 25 projecting at a lateral side of the cylinder support 11. As shown in FIGS. 5A and 5B, the ring member 23 has an inner circumference thereof formed with a plurality of axial engagement slots or recessed parts 23a radially inwardly open at even circumferential spacing pitches and a plurality of remaining sectorial teeth circumferen-tially channeled to define a locking engagement groove or thread portion 23b.

The left end 12b of each tie-rod 12 has an outer circumference thereof formed with a plurality of sectorial engagement teeth or projections 12c at even circumferential spacing pitches in one-to-one correspondence to the recessed parts 23a of the ring member 23. In FIG. 5A, the left end 12b of tie-rod 12 is inserted in the ring member 23, as it is positioned at an angle to make the projections 12c engage with the recessed parts 23a. From this position, the ring member 23 is rotated clockwise (direction a) by the cylinder 21 into a position shown in FIG. 5B, where the projections 12c engage with the thread portion 23b, thus locking an axial displacement of the tie-rod 12, thereby effecting a connection of its left end 23b with the cylinder support 11. The tie-rod 12 can be released from this locking, by operating the cylinder 21 to rotate the ring member 23 counter-clockwise (direction b) into the position of FIG. 5A, where the projections 12c coincide with the recessed parts 23a, permitting the tie-rod 12 to be axially displaced.

As will be seen from FIGS. 1 and 2, the movable platen 7 has the tie-rods 12 provided through four corners thereof, so that the platen 7 is movable along the tie-rods 12. Moreover, the movable platen 7 is connected to the clamp ram 10 of the clamp cylinder 9. Further, the platen 7 is permitted to advance and retreat relative to the stationary platen 5, together with a left-right movement of the front and rear mold open-close cylinders 13, i.e., along with a longitudinal motion thereof. The mold open-close cylinders 13 are disposed at a vertically intermediate front part and a vertically intermediate rear part of the cylinder support 11, respectively, and have their cylinder rods 13a connected to the movable platen 7.

Figure 6:
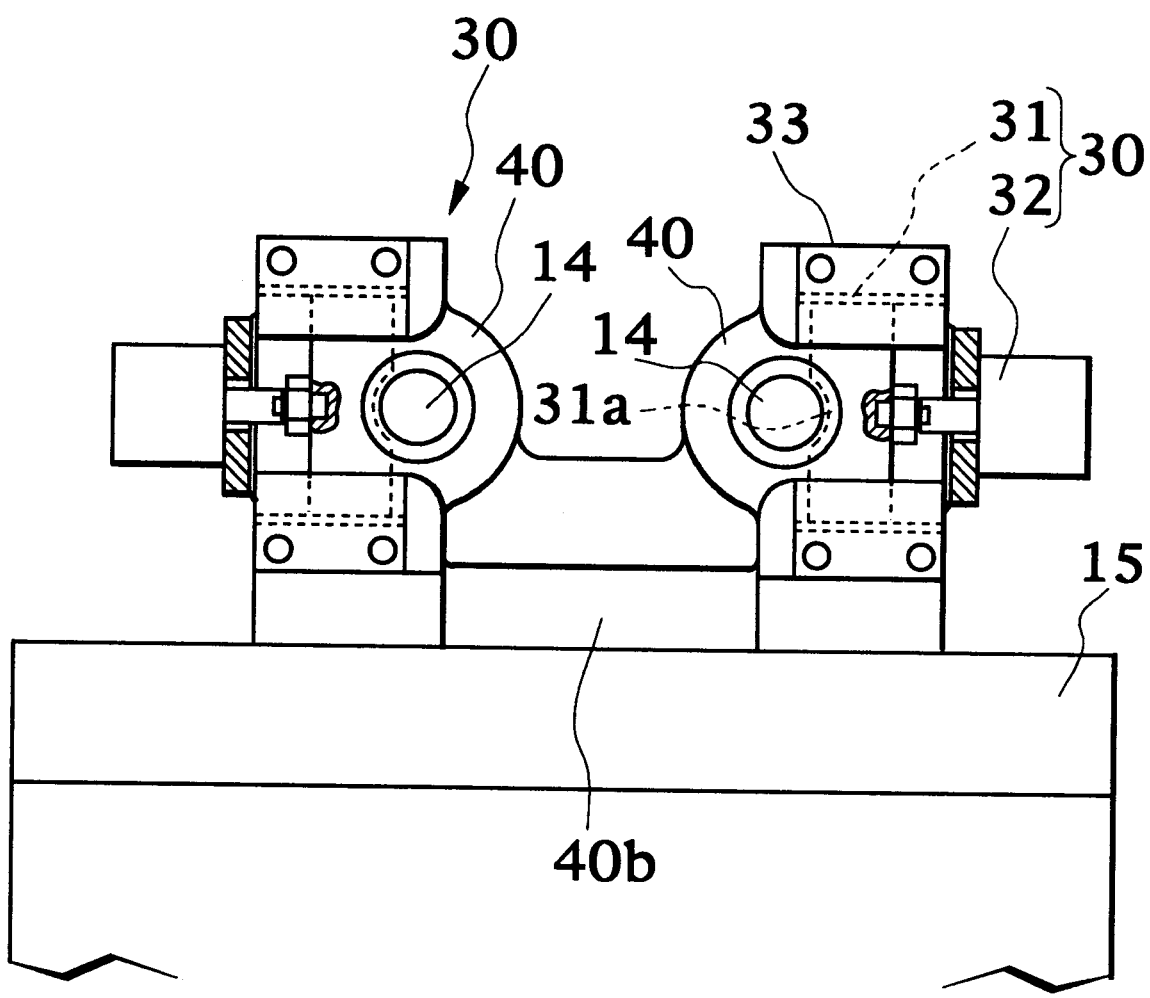
FIG. 6 is a section along line VI—VI of FIG. 1.

Next, there will be described an arrangement of the injection unit 3, with reference to FIGS. 1, 2, 6 and 7. FIG. 6 is a section VI—VI of FIG. 1, and FIG. 7, a partially cut away plan of FIG. 6.

The injection unit 3 is provided as a mobile portion M on a base portion B composed of a base 15 and guide devices 40, and comprises a pair of front and rear guide bars 14, an injection nozzle 17 for injecting a body of molten resin, a pair of front and rear nozzle touch cylinders 16 and later-described other auxiliary mechanisms.

The nozzle 17 is provided at an end of a heating barrel 26 with a screw 27 fitted therein. The heating barrel 26 is connected at a base end thereof substantially to a longitudinally intermediate part of an injection bracket 43. Designated at reference character 41 is a hydraulic pump motor for driving the screw 27, and 42 is a thrust box for bearing a thrust load of the screw 27.

The nozzle touch cylinders 16 are arranged at both transverse sides of the heating barrel 26, and connected at their base ends to the injection bracket 43. Respective cylinder rods 16a of the nozzle touch cylinders 16 are connected at their distal ends (see FIG. 3) to the stationary platen 5 in a detachable manner such as by use of unshown nuts. The rods 16a can be released from this connection, for maintenance services to components of the injection unit 3, e.g. to the nozzle 17 or screw 27.

The injection bracket 43 is integrally fixed to the guide bars 14, which are slidably supported by the guide devices 40, which are arranged as transversely opposing couples longitudinally spaced apart from each other and fixed to the base 15 at positions rightwardly off from the stationary platen 5. Accordingly, the injection unit 3 is permitted to longitudinally advance and retreat relative to the stationary platen 5.

Figure 7:
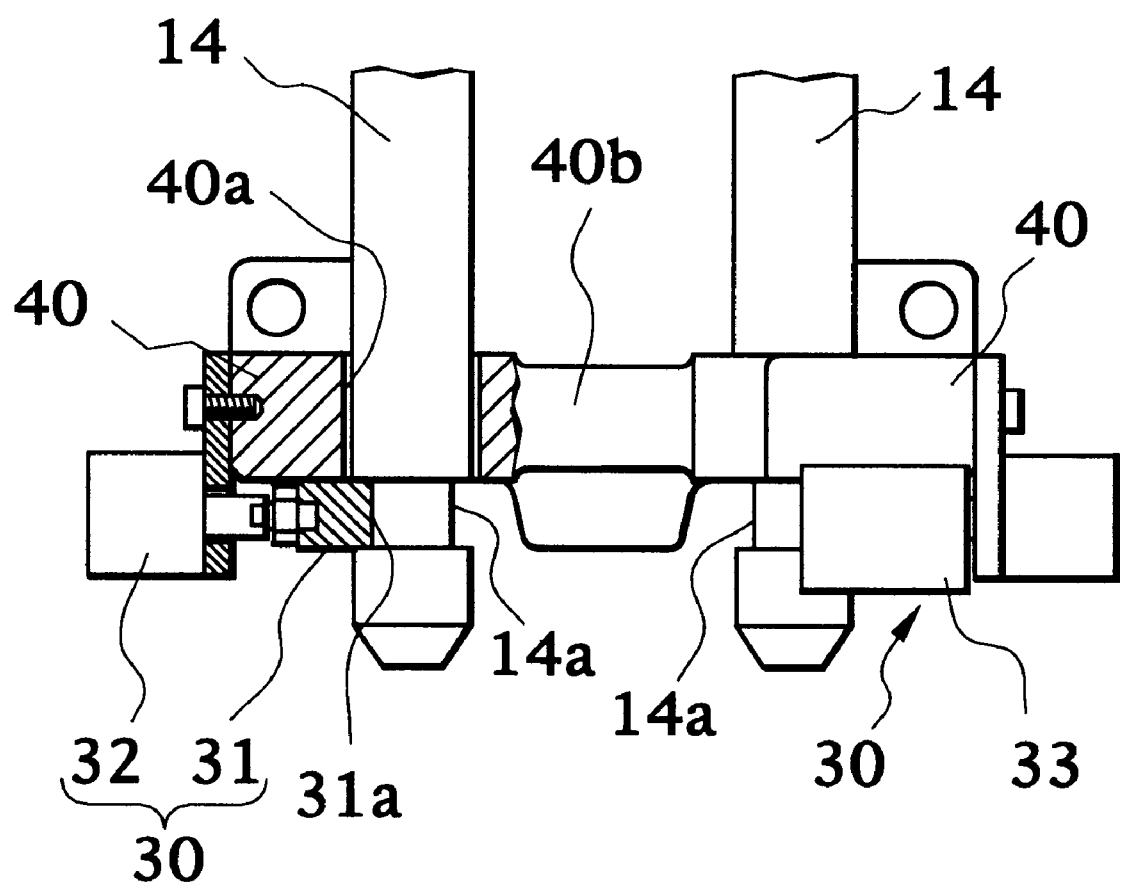
FIG. 7 is a plan, partly in section, of FIG. 6.

FIGS. 6 and 7 show a left one of the guide device couples, whose guide devices 40 have a common fixing part 40b to the base 15, and their guide holes 40a disposed at both sides of the fixing part 40b to have the guide bars 14 provided therethrough in parallel. The guide bars 14 are arranged such that, when the projection unit 3 has come back to a retreat limit thereof, their left end parts still remain leftwardly projecting from the left couple of guide devices 40 near to the stationary platen 5, which left end parts are each formed with an annular engagement groove 14a (see FIG. 7). Moreover, the left guide devices 40 each have a guide bar locking mechanism 30.

The guide bar locking mechanism 30 comprises a lock plate 31, and a lock cylinder 32 for driving the lock plate 31 to slide. The lock plate 31 has at one lateral side thereof an engagement recess 31a formed therein (see FIG. 6) for a locking engagement with the engagement groove 14a of corresponding guide bar 14, and is arranged in a cover 33 fixed to corresponding guide device 40 so as to be slidable along a side face of a guide member of the device 40 (see FIG. 7) in a perpendicular direction to an axial direction of the guide bar 14. Accordingly, when the injection unit 3 is positioned at the retreat limit, the guide bar locking mechanism 30 is operable such that, as the lock plate 31 is driven by the lock cylinder 32 into an advanced position relative to the guide bar 14, the engagement recess 31a engages with the engagement groove 14a, thereby locking an axial sliding of the guide bar 14. Further, as the lock plate 31 is driven by the lock cylinder 32 to retreat from the position locking the guide bar 14, the engagement recess 31a disengages from the engagement groove 14a, thereby dissolving the locking state.

Next, there will be described actions of the injection molding machine 1 in a molding operation and for a maintenance service.

In the molding operation, the tie-rod locking mechanisms 20 are put in their locking status, and the guide bar locking mechanisms 30, in their unlock status. In other words, in the clamping unit 2, the tie-rods 12 as well as the stationary platen 5 are locked to the cylinder support 11, while the injection unit 3 is slidable relative to the base portion B.

In the clamping unit 2, after a mold close operation by the mold open-close cylinders 13, the clamp cylinder 9 provides the tie-rods 12 with tensile forces to effect a mold clamping. At the injection side, as the mold clamping is over, the nozzle touch cylinders 16 are operated to make the injection unit 3 advance toward the stationary platen 5, and in due course the nozzle 17 has a touching relation to a combination of the molds, where it injects a body of molten resin into a cavity. After a molding of the resin, the injection unit 3 is driven back by the nozzle touch cylinders 16, so that it retreats from the stationary platen 5. Concurrently, at the clamping side, the mold open-close cylinders 13 are operated for a mold open operation to take out molded articles. Along such a sequence of operations, the movable platen 7 is caused to advance and retreat by a stroke $S_i$ relative to the stationary platen 5. As the injection unit 3 slides to advance and retreat relative to the stationary platen 5, the guide bars 14 likewise slide. In an advanced position, the left end part of each guide bar 14 leftwardly projects from the side face of the guide member of the guide device 40, as shown by double-dashed chain line in FIG. 1.

The molding operation is a repetition of such the sequence of operations.

For the maintenance service, the guide bar locking mechanisms 30 are put in their locking status, while the tie-rod locking mechanisms 20 are put in their unlock status.

More specifically, at the clamping side after the mold open operation, as the injection unit 3 has reached the retreat limit, the molds 4 and 6 are detached from the platens 5 and 7, respectively, and the tie-rod locking mechanisms 20 are caused to unlock, thereby releasing the left ends 23b of the tie-rods 12 from their locked connection with the cylinder support 11. At the injection side, the guide bar locking mechanisms 30 are caused to lock, so that the injection unit 3 is locked to the base portion B.

Under such a condition, as the nozzle touch cylinders 16 are operated to make the cylinder rods 16a retreat inside cylinders, the stationary platen 5 is displaced toward the injection unit 3 by a guiding of the linear guides 18, cooperating with the movable platen 7 to have a sufficient gap secured therebetween for a facilitated maintenance work.

After the maintenance service, the nozzle touch cylinders 16 are operated to make the cylinder rods 16a proceed outside the cylinders, displacing the stationary platen 5 by a guiding of the linear guides 18 so that it is restored in a molding position for the molding operation, when the guide bar locking mechanisms 30 are operated into the unlock status and the tie-rod locking mechanisms 20 are made to lock. As a result, the injection unit 3 is permitted to advance and retreat relative to the stationary platen 5, and the left ends 23b of the tie-rods 12 are connected to the cylinder support 11, allowing the molding operation to start. Along such a sequence of operations, the stationary platen 5 is caused to reciprocate or go and back by a stroke $S_2$ shown in FIG. 1.

As will be seen from the foregoing description, the injection unit 1 is adapted to have a wide gap secured between the stationary platen 5 and the movable platen 7 for a maintenance service, permitting a facilitated maintenance work. Moreover, the stationary platen 5 is displaced toward the injection unit 3 by operation of the nozzle touch cylinders 16, without the provision of a dedicated cylinder for displacement, thus eliminating the need of a complicated or large-scaled structure, while achieving an enhanced function to provide an increased gap between the platens 5 and 7.

Next, there will be described an injection molding machine 50 according to a second embodiment of the invention, with reference to FIGS. 8 to 10.

Figure 8:
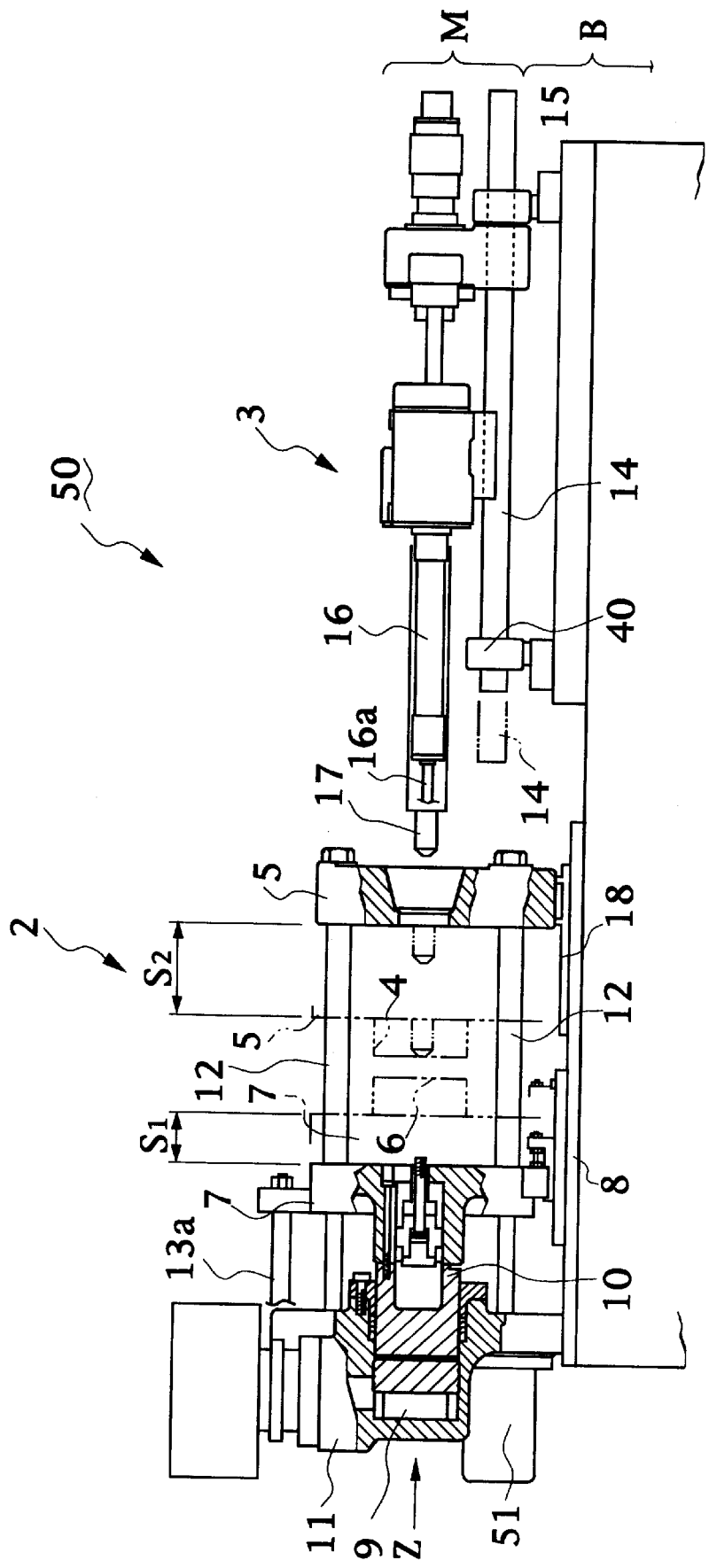
FIG. 8 is a front view, partly in section, of an entirety of an injection molding machine according to a second embodiment of the invention.
Figure 9:
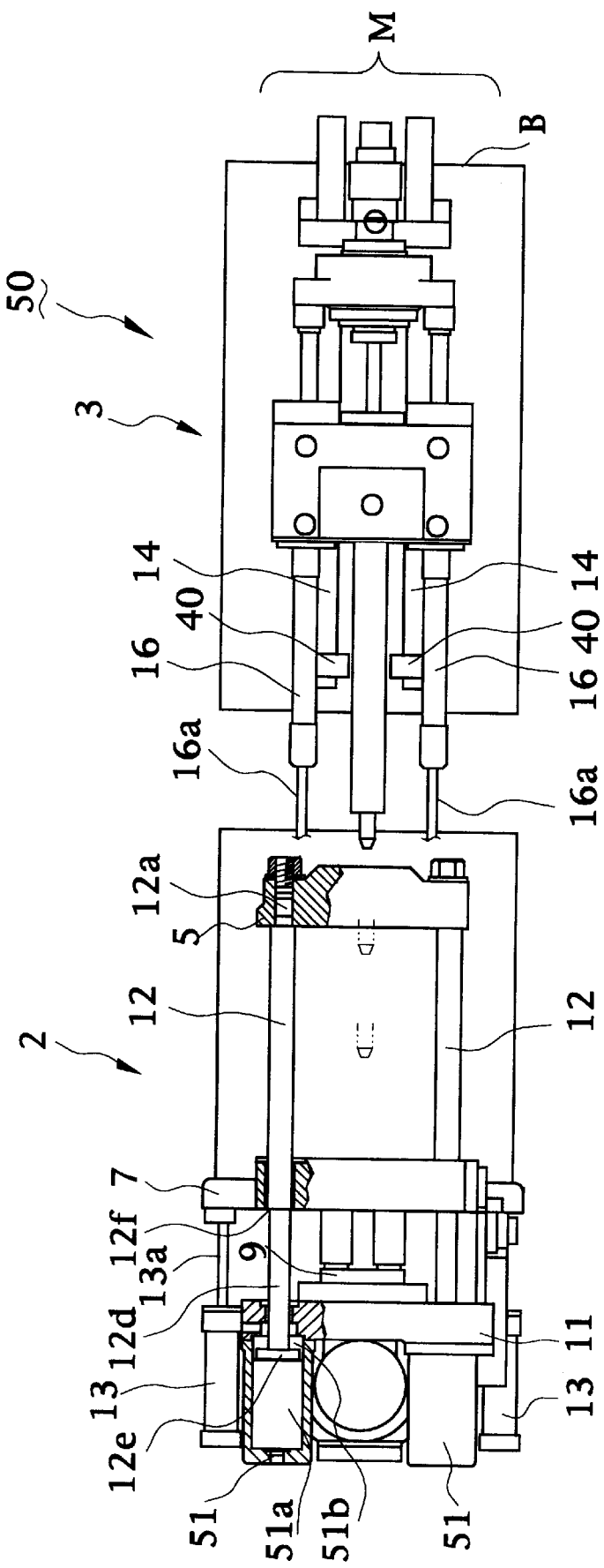
FIG. 9 is a plan, partly in section, of the injection molding machine of FIG. 8.
Figure 10:
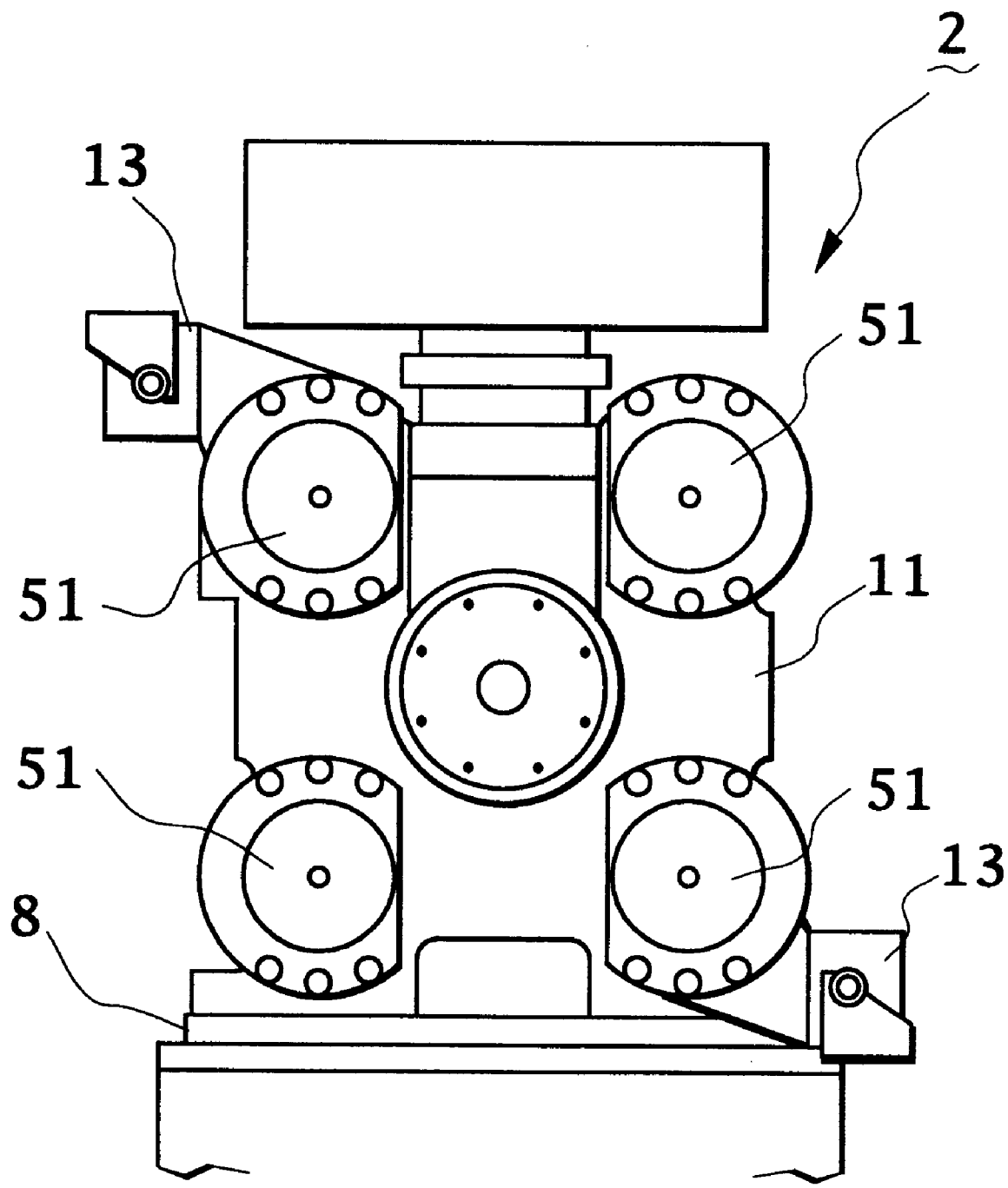
FIG. 10 is view along an arrow Z of FIG. 8.

FIG. 8 is a front view of the injection molding machine 50, FIG. 9, a plan of the same, and FIG. 10, a view Z of FIG. 8.

The injection molding machine 50 is different from the machine 1 of the first embodiment in constitution of a displacing means for displacing a stationary platen 5 to provide a gap for a maintenance service.

In the machine 50 of the second embodiment, the displacing means comprises a quatre of displacement cylinders 51 (see FIG. 10) fixed to a cylinder support 11 of a clamping unit 2, a quadruplet of tie-rods 12 for connecting the cylinders 51 to the stationary platen 5, and a pair of nozzle touch cylinders 16 with cylinder rods 16a connected at their ends to the stationary platen 5.

The displacement cylinders 51, which have inserted therein left ends 12d of the tie-rods 12 for their connections with the cylinder support 11, are adapted to keep the connections of the tie-rods 12 with the cylinder support 11 in a molding operation and to displace the stationary platen 5 toward an injection unit 3 through the tie-rods 12 for the maintenance service. The nozzle touch cylinders 16 are changeable into their released status for the maintenance service, as the injection unit 3 is positioned at a retreat limit. Accordingly, like effects to the first embodiment are achievable with the injection molding machine 50 that does not have the tie-rod locking mechanism 20 nor the guide bar locking mechanism 30.

The displacement cylinders 51 are disposed, as in FIG. 10, at four corners of the cylinder support 11 in one-to-one correspondence to the tie-rods 12. As shown in FIG. 9, the left ends 12d of the tie-rods 12 are slidably provided through the cylinder support 11, to be inserted in the displacement cylinders 51, constituting cylinder rods of the cylinders 51, which cylinder rods 12d have piston parts 12e formed at their ends. Inside of each displacement cylinder 51 is separated by the piston part 12e into left and right pressure chambers 51a and 51b, which have a pressure difference developed therebetween to thereby cause corresponding tie-rod 12 to axially slide.

The tie-rod 12 is reduced in diameter along the piston rod 12d relative to a guiding part thereof for a movable platen 7, so that a step 12f is formed at a boundary therebetween.

The step 12f is forced against the cylinder support 11, with the right pressure chamber 51b of the displacement cylinder 51 set for an increased pressure that is so high as to overcome a clamping force. As a result, the left ends 12d of the four tie-rods 12 are kept locked to the cylinder support 11, permitting a parallel relation to be secured between the stationary platen 5 locked by the tie-rods 12 and the movable platen 7 driven by mold open-close cylinders 13 which are fixed to diagonal locations of the cylinder support 11, while the stationary platen 5 is held in a molding position shown by double-dashed chain line in FIG. 8.

Under this condition, the injection molding machine 50 is operable for the molding operation, like the machine 1 of the first embodiment. In the molding operation, the movable platen 7 is reciprocally movable by a stroke $S_1$ (see FIG. 8).

Next, there will be described actions of the injection molding machine 50 for the maintenance service.

After a mold open action at the clamping side, as the injection unit 3 has reached the retreat limit, the nozzle touch cylinders 16 are changed over to their released status, where their cylinder rods 16a are free to advance and retreat relative to the cylinders, while the injection unit 3 except the rods 16a is kept by unshown adequate members from running over the retreat limit.

Under this condition, the left pressure chamber 51a of each displacement cylinder 51 is supplied with hydraulic oil, driving the tie-rod 12 to rightwardly displace the stationary platen 5, to achieve a status illustrated by solid lines in FIGS. 8 and 9. As the stationary platen 5 is displaced to the right, the movable platen 7 is permitted to have a sufficient gap secured therebetween for the maintenance service.

After the maintenance service, the right pressure chamber 51b is supplied with hydraulic oil, so that the stationary platen 5 is restored to the molding position for the molding operation, and the right pressure chamber 51b has an overcoming pressure to the clamping force, forcing the displacement cylinder 51 to lock the left end 12d of the tie-rod 12 to the cylinder support 11. In a sequence of such operations, the stationary platen 5 is reciprocated by a stroke $S_2$.

As will be seen from the foregoing description, the injection molding machine 50 is adapted for a facilitated maintenance work, like the machine 1 of the first embodiment. Moreover, the stationary platen 5 is displaced toward the injection unit 3 by the displacement cylinders 51 that can further serve for locking the tie-rods 12 to the cylinder support 11, without the provision of an extra mechanism for the locking, thus eliminating the need of a complicated or large-scaled structure, while achieving an enhanced function to provide an increased gap between the platens 5 and 7.

It will be understood that the guide bar locking mechanism may preferably be constituted with a friction member or material inserted between a guide bar 14 and a lock plate 31 for locking a sliding movement of the guide bar 14 by frictional forces.

While preferred embodiments of the present invention have been described using specific terms, such description is for illustrative purposes, and it is to be understood that changes and variations may be made without departing from the spirit or scope of the following claims.

What is claimed is:

1. An injection molding machine comprising:
    a clamping unit including:
    a stationary platen for holding a stationary mold;
    a cylinder support fixed to a frame;
    a clamp cylinder incorporated in the cylinder support;
    a tie-rod for connecting the stationary platen to the cylinder support;
    a movable platen for holding a movable mold co-operable with the stationary mold to provide a mold cavity;
    the clamp cylinder having a clamp ram connected to the movable platen;
    a mold open-close cylinder for making the movable platen advance and retreat relative to the stationary platen; and
    the clamp cylinder being operable after a mold close action to hold the tie-rod under a tensile force to perform a mold clamp action;
    an injection unit including:
    a guide bar for mounting the injection unit on a base so that the injection unit is movable in a mold openclose direction;
    a nozzle touch cylinder having a cylinder rod for connecting the injection unit to the stationary platen, the nozzle touch cylinder being operable for driving the injection unit into an advance-retreat motion relative to the stationary platen; and
    an injection nozzle adapted in an advanced position of the injection unit to touch the mold, for injecting molten resin to the mold cavity; and
    displacing means adaptive for positioning the stationary platen to the frame, permitting the stationary platen to be displaced toward the injection unit to allow an elongation of the tie-rod in the mold clamp action, the displacing means including the nozzle touch cylinder for displacing the stationary platen toward the injection unit for a maintenance service.

2. An injection molding machine according to claim 1, wherein the displacing means further comprises:

tie-rod locking means for keeping the tie-rod in a connection with the cylinder support in a molding operation and for releasing the tie-rod from the connection for the maintenance service; and guide bar locking means for keeping the injection unit drivable into the advance-retreat motion in the molding operation and for locking an advance-retreat motion of the guide bar to have the injection unit held at a retreat limit thereof for the maintenance service.

* * * * *